(12) United States Patent
Huang

(10) Patent No.: US 7,168,821 B2
(45) Date of Patent: Jan. 30, 2007

(54) LENS ASSEMBLY WITH LIGHT MOUNTABLE ON HEAD COVERING

(75) Inventor: Tsung Hui Huang, Taichung Hsien (TW)

(73) Assignee: Gem Optical Co., Ltd., Taichung Hsien (TW)

( * ) Notice: Subject to any disclaimer, the term of this patent is extended or adjusted under 35 U.S.C. 154(b) by 16 days.

(21) Appl. No.: 11/004,888

(22) Filed: Dec. 7, 2004

(65) Prior Publication Data

US 2006/0120066 A1    Jun. 8, 2006

(51) Int. Cl.
F21V 21/084 (2006.01)
F21V 21/08 (2006.01)
A42B 1/24 (2006.01)
A63B 69/36 (2006.01)

(52) U.S. Cl. .............. 362/103; 362/105; 362/106; 362/421; 473/268; 24/3.1; 359/409; 359/815

(58) Field of Classification Search ................ 362/190, 362/191, 103, 197, 199, 105, 106, 287, 427, 362/430, 419, 421; D26/38; 473/268; 24/3.1; 259/409, 815

See application file for complete search history.

(56) References Cited

U.S. PATENT DOCUMENTS 4,967,323 A * 10/1990 Johnson et al. ............. 362/103
5,667,291 A * 9/1997 Caplan et al. .............. 362/105
6,116,729 A * 9/2000 Huang ......................... 351/41
6,215,601 B1 * 4/2001 Huang ........................ 359/802
6,467,929 B2 * 10/2002 Lee ............................ 362/191
6,575,587 B2 * 6/2003 Cramer et al. .............. 362/105
6,619,813 B1 * 9/2003 Schnell ....................... 362/116
6,764,194 B1 * 7/2004 Cooper ....................... 362/105

* cited by examiner

Primary Examiner—Sandra O'Shea
Assistant Examiner—Jacob Y. Choi
(74) Attorney, Agent, or Firm—Bacon & Thomas

(57) ABSTRACT

Provided is a device mountable on a head covering. The device comprises a flexible clamp comprising an elongated gap open to its rear, a lower receptacle, two recessed slides at both outer sides of the receptacle, and a toothed-section on a top of the receptacle; a sliding seat of U-section comprising two tabs at both inner sides for retaining a lower portion of the clamp in place after removably sliding the slides therethrough, a latch projected from its bottom to urge against the toothed-section, and a flexible hook having a toothed inner surface; and a lens hingedly coupled to the inner surface of the hook in a gear manner, and a universal joint type light mounted on top of the clamp. The invention enables a desired object to be seen larger and more clear through the pivotal lens (e.g., a magnifying lens) and with light emitted from the light.

6 Claims, 10 Drawing Sheets

LENS ASSEMBLY WITH LIGHT MOUNTABLE ON HEAD COVERING

FIELD OF THE INVENTION

The present invention relates to headgear and lens combinations and more particularly to a pivotal lens (e.g., magnifying lens) assembly adapted to couple to a light by means of a universal joint prior to mounting on a head covering or the like.

BACKGROUND OF THE INVENTION

Headgear and lens combinations are well known. There have been numerous suggestions in prior patents for the same. However, the prior art suffered from several disadvantages. For example, angle adjustment mechanism is either not available or limited in its operation, they are relatively complex in constructions, lens replacement is not possible due to fixed coupling, they are adapted to couple to the brim of a hat only, and light is not mounted. Thus, the need for improvement still exists.

SUMMARY OF THE INVENTION

It is an object of the present invention to provide a device mountable on a head covering or a member held to the head, comprising a flexible clamp comprising an elongated gap open to its rear, a lower receptacle, two recessed slides formed at both outer sides of the receptacle, a toothed-section disposed on a top of the receptacle, and a flexible hollow cylinder on a top of the clamp; a sliding seat of U-section comprising two tabs at both inner sides for retaining a lower portion of the clamp in place after removably sliding the slides therethrough, a latch projected from its bottom to urge against one of a plurality of valleys of the toothed-section, and a flexible hook having a plurality of parallel teeth on its inner surface; a lens comprising two top risers and a ridged bar interconnected the risers, the bar being adapted to dispose in the inner surface of the hook for meshing therewith; and a light comprising a downward peg having an enlarged ball end removably inserted into the cylinder to form a universal joint. By utilizing the present invention, a desired object can be seen larger and more clear through the pivotal lens (e.g., a magnifying lens) and with light emitted from the universal joint type light.

In one aspect of the present invention, the head covering is one of a cap and a helmet having its brim adapted to securely insert into the gap.

In another aspect of the present invention, the member held to the head is one resembled a pair of eyeglasses without lens.

In a further aspect of the present invention, the hook is extended from either a rear end or a forward end of the sliding seat.

The above and other objects, features and advantages of the present invention will become apparent from the following detailed description taken with the accompanying drawings.

DETAILED DESCRIPTION OF THE PREFERRED EMBODIMENTS

Figure 1:
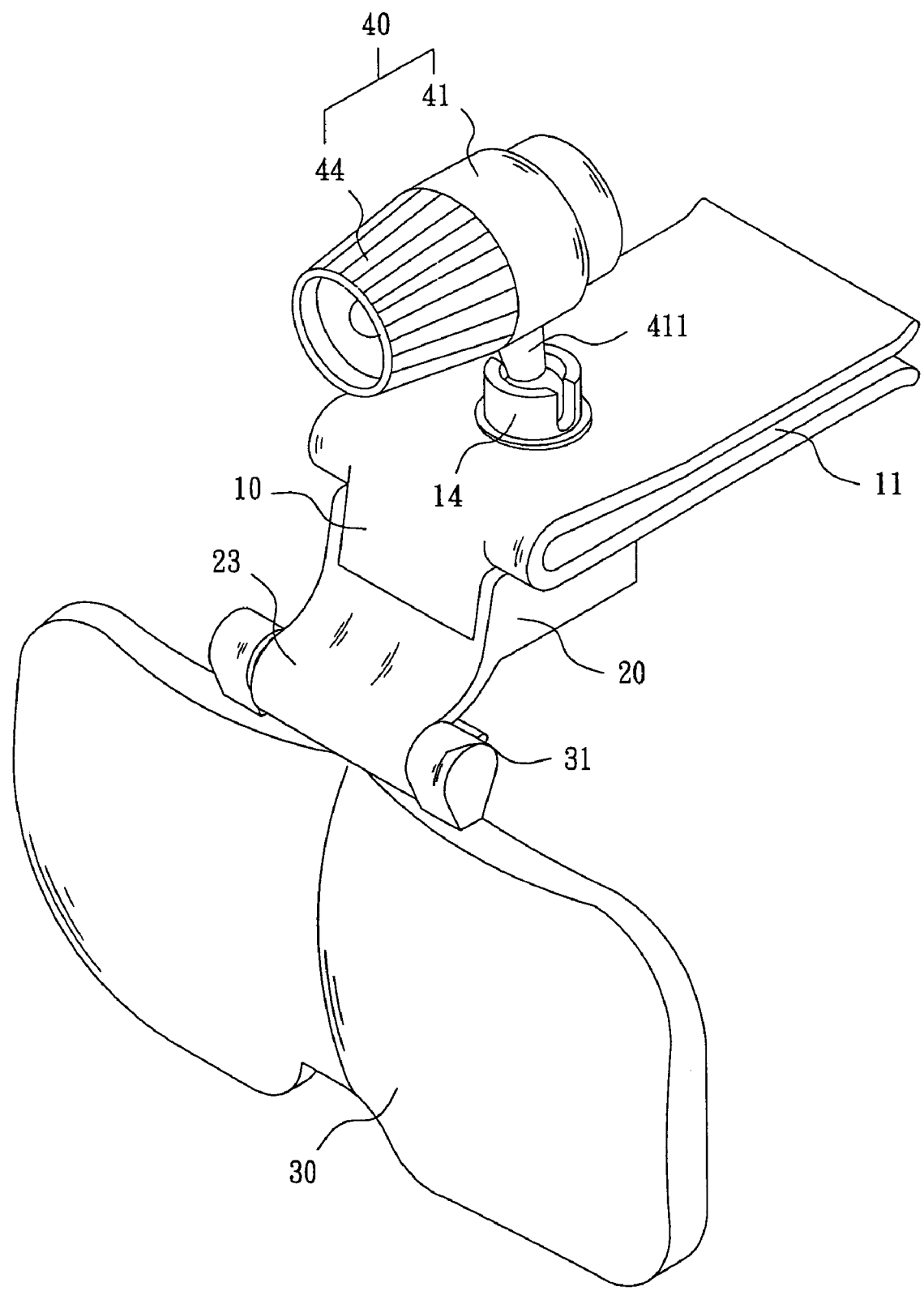
FIG. 1 is a perspective view of a first preferred embodiment of lens assembly with light according to the invention.
Figure 2:
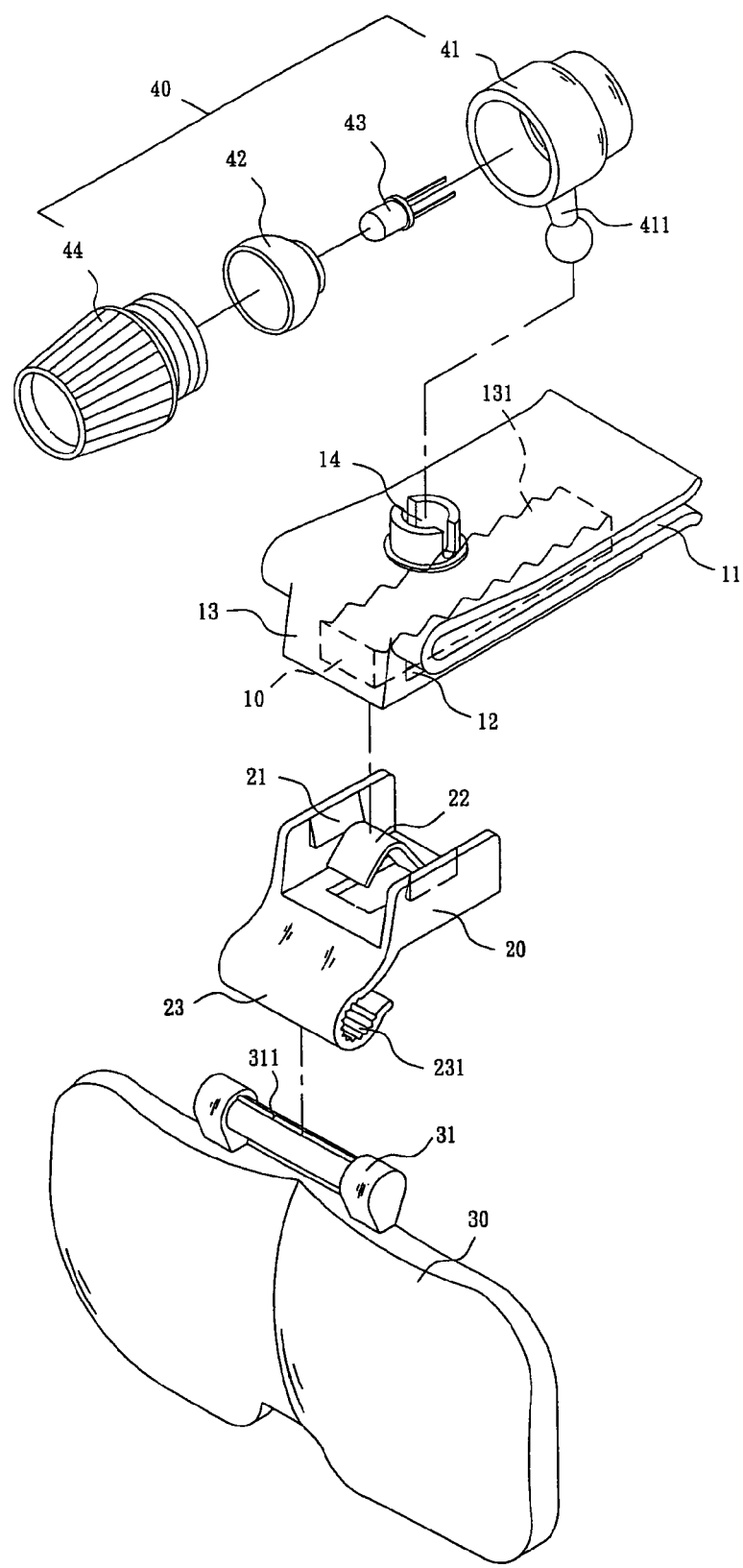
FIG. 2 is an exploded view of FIG. 1.
Figure 3:
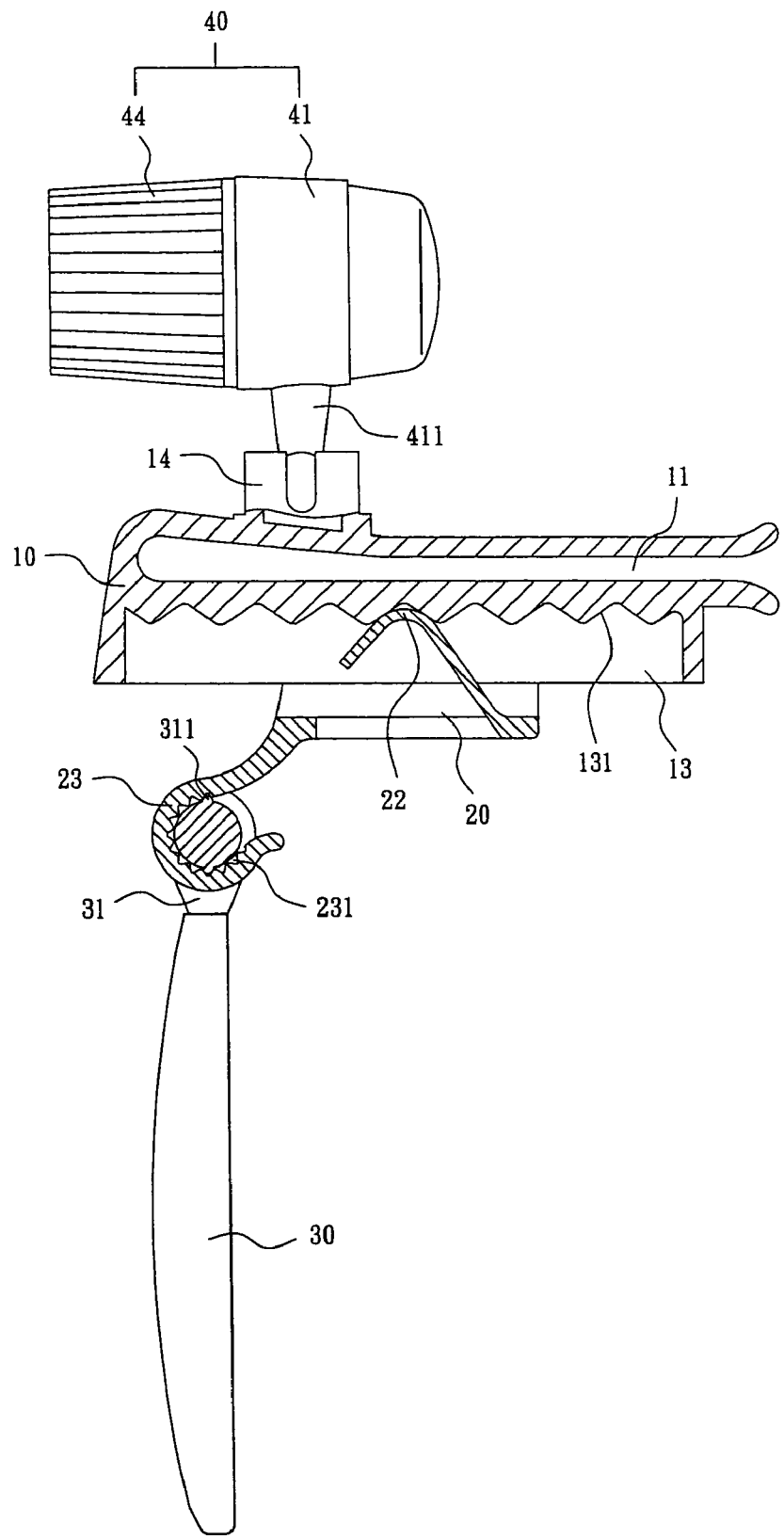
FIG. 3 is a side view of FIG. 1 with intermediate and lower portions of the assembly being shown in section.
Figure 4:
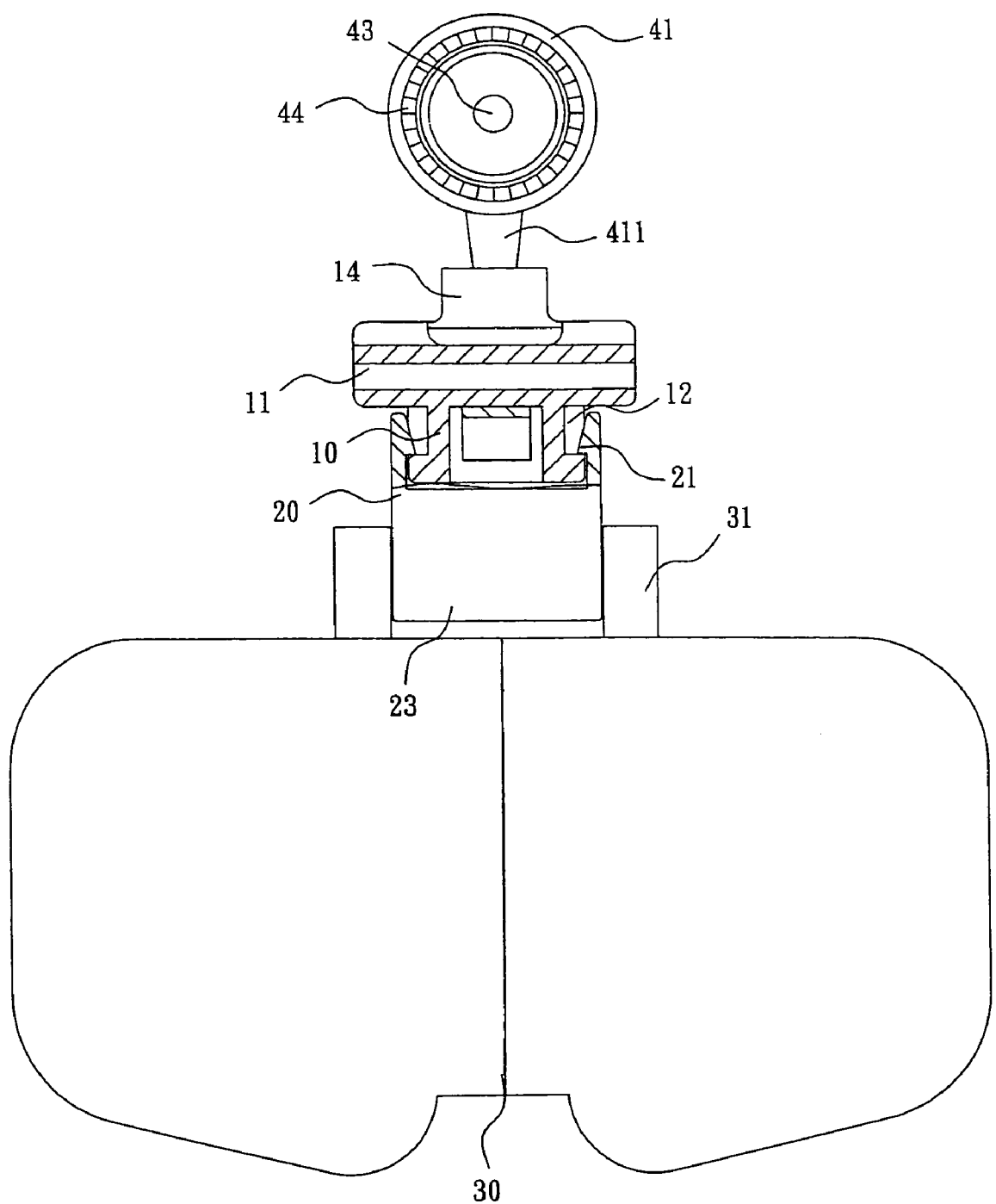
FIG. 4 is a front view of FIG. 1 with an intermediate portion of the assembly being shown in section.
Figure 5:
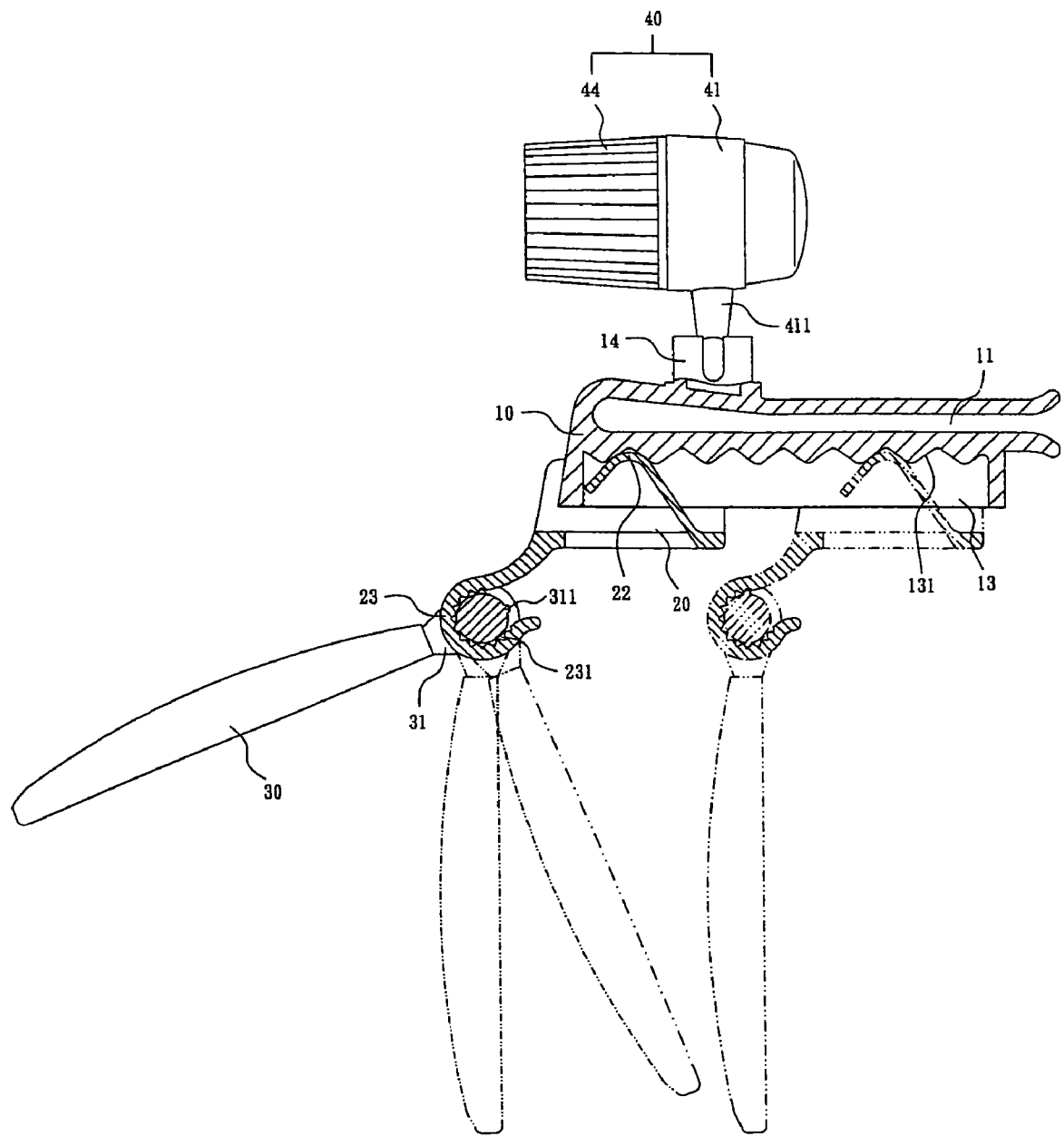
FIG. 5 is a view similar to FIG. 3 illustrating angle adjustment of the lens.

Referring to FIGS. 1 to 5, there is shown a first preferred embodiment of the invention comprising a clamp 10, a sliding seat 20, a lens 30, and a light 40. Each component will be described in detailed below.

The clamp 10 is an elongated, flexible member bent at one end to form an elongated lengthwise gap 11 open to the rear. The clamp 10 further comprises a lower receptacle 13, two recessed slides 12 each formed at an outer side of the receptacle 13, a toothed-section 131 on a top of the receptacle 13, and a flexible hollow cylinder 14 on a top of the clamp 10.

The sliding seat 20 has a body of U-section and comprises two tabs 21 at both inner sides for retaining a lower portion of the clamp 10 in place after sliding the slides 12 through the U-shape body, a gable-shaped latch 22 projected from its bottom for urging against one of a plurality of valleys of the toothed-section 131, and a flexible forward hook 23 having a plurality of parallel teeth 231 on its inner surface. The lens 30 is implemented as a magnifying lens in the embodiment. It is also contemplated that the magnifying lens may be replaced by a concave, a convex, or a tinted lens in certain embodiments. The lens 30 comprises two top risers 31 and a ridged bar 311 interconnected the risers 31. The hook 23 is adapted to pass around the bar 311 to cause its teeth 231 to mesh with the ridges of the bar 311 (i.e., forming a hinge). This completes the assembly of the lens 30, the sliding seat 20, and the clamp 10. It is seen that the lens 30 is adapted to pivot about the sliding seat 20 (see FIG. 5). Also, a relative position of the sliding seat 20 and the clamp 10 can be adjusted by sliding the sliding seat 20 about the clamp 10. The light 40 comprises a forward hollow barrel 44 having an externally threaded rear extension, a reflector 42 mounted in the barrel 44, a bulb 43 mounted in a base of the reflector 42, and a head 41 threadedly secured to the barrel 44, the head 41 having a peg 411 extended downwardly, the peg 411 having an enlarged ball end inserted into the cylinder 14 to form a universal joint. This means that the light 40 is permitted to swing a limited angle in almost any direction. This completes the assembly of the invention. Note that the light 40 can be powered by one or more internal cells in one configuration. Alternatively, a battery pack having one or more cells is provided for powering the light 40 from external. That is, the battery pack is an independent member and is not installed in the light 40 for the sake of decreasing weight. Still alternatively, the light 40 can be powered by an external AC power source coupled through a power cord.

Figure 6:
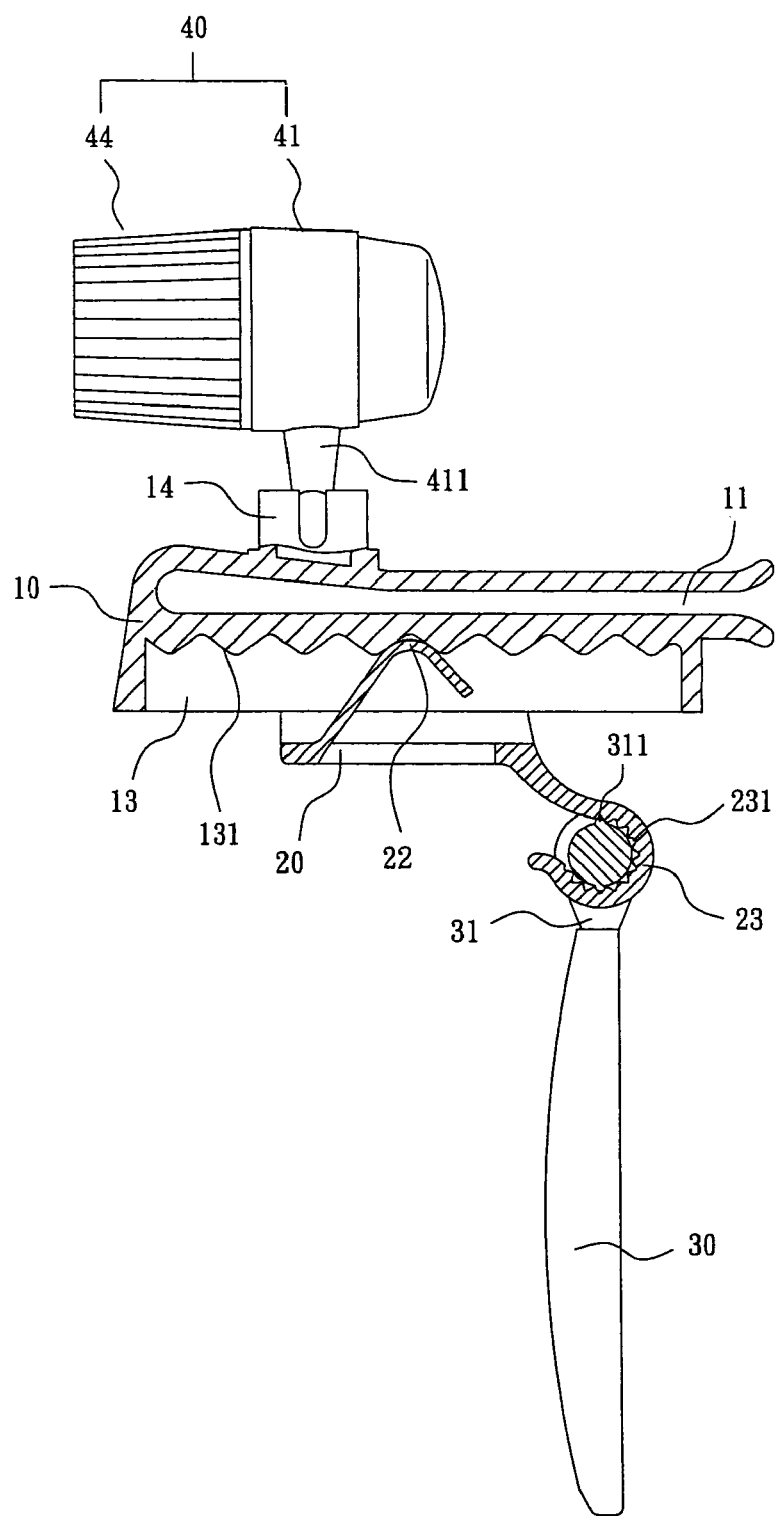
FIG. 6 is a view similar to FIG. 3 illustrating another arrangement of the lens in the assembly.
Figure 7:
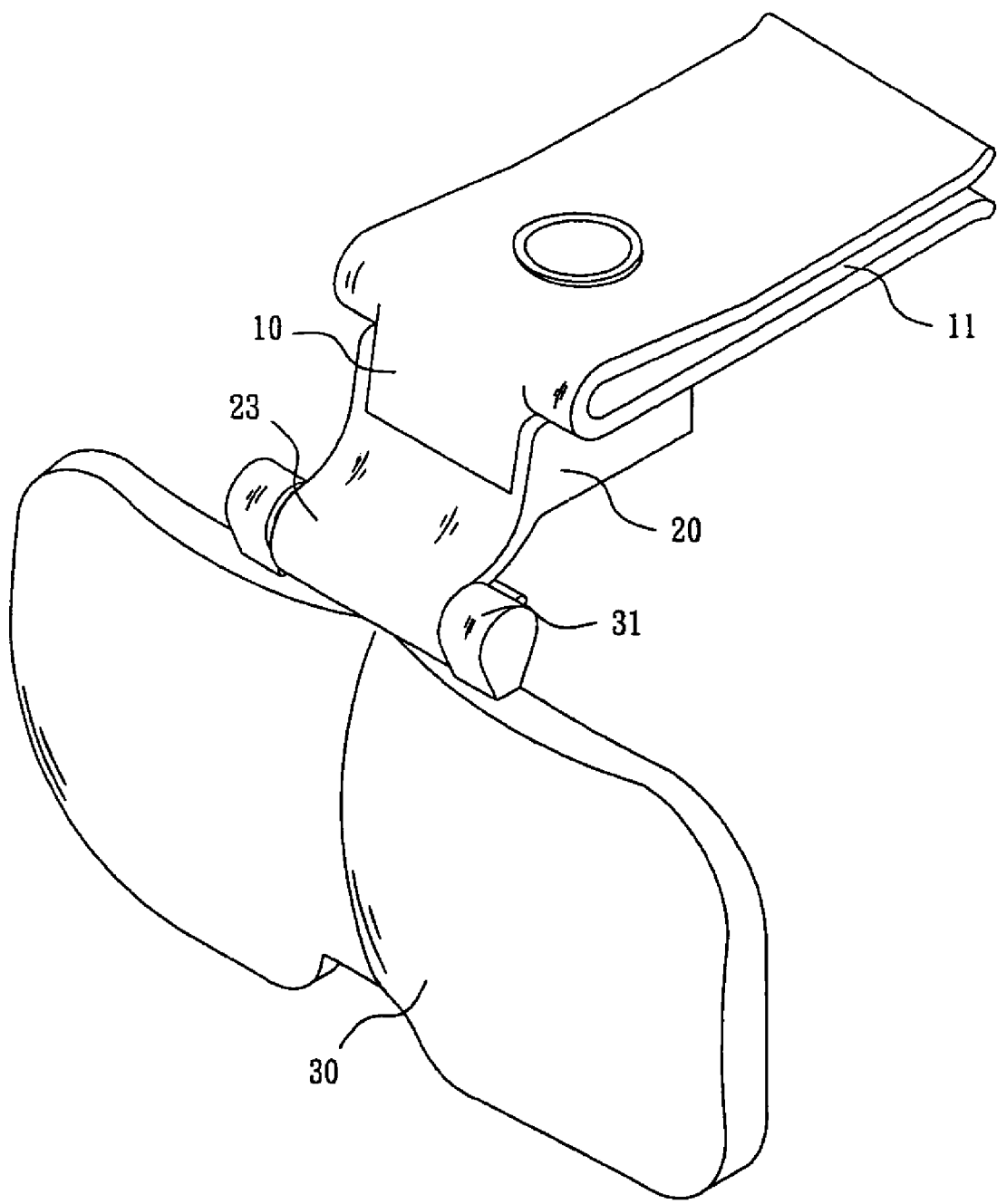
FIG. 7 is a perspective view of the lens assembly with light removed according to a second preferred embodiment of the invention.
Figure 8:
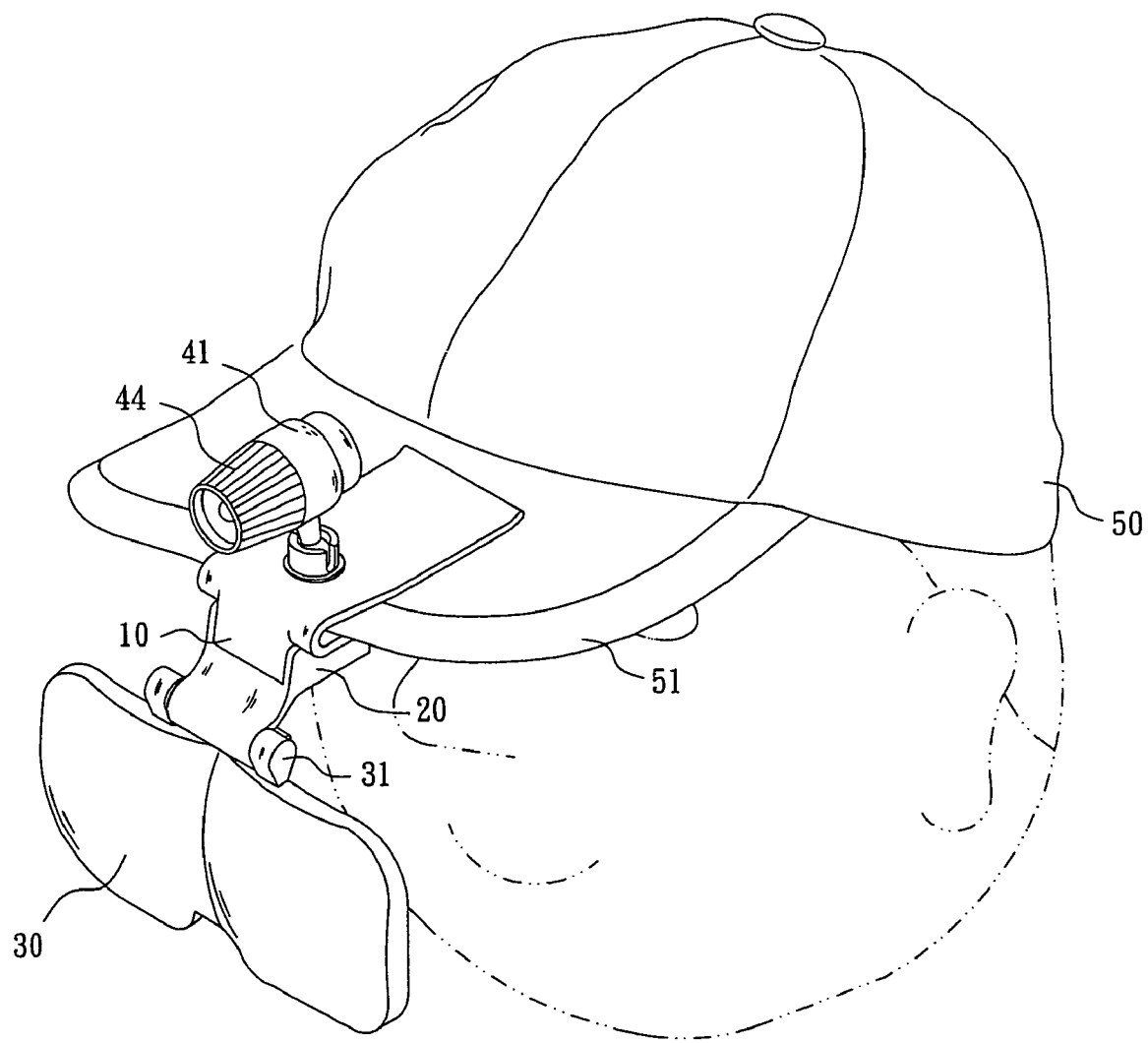
FIG. 8 is an environmental view of the lens assembly with light being mounted on the brim of a cap covered on the head shown in phantom lines.
Figure 9:
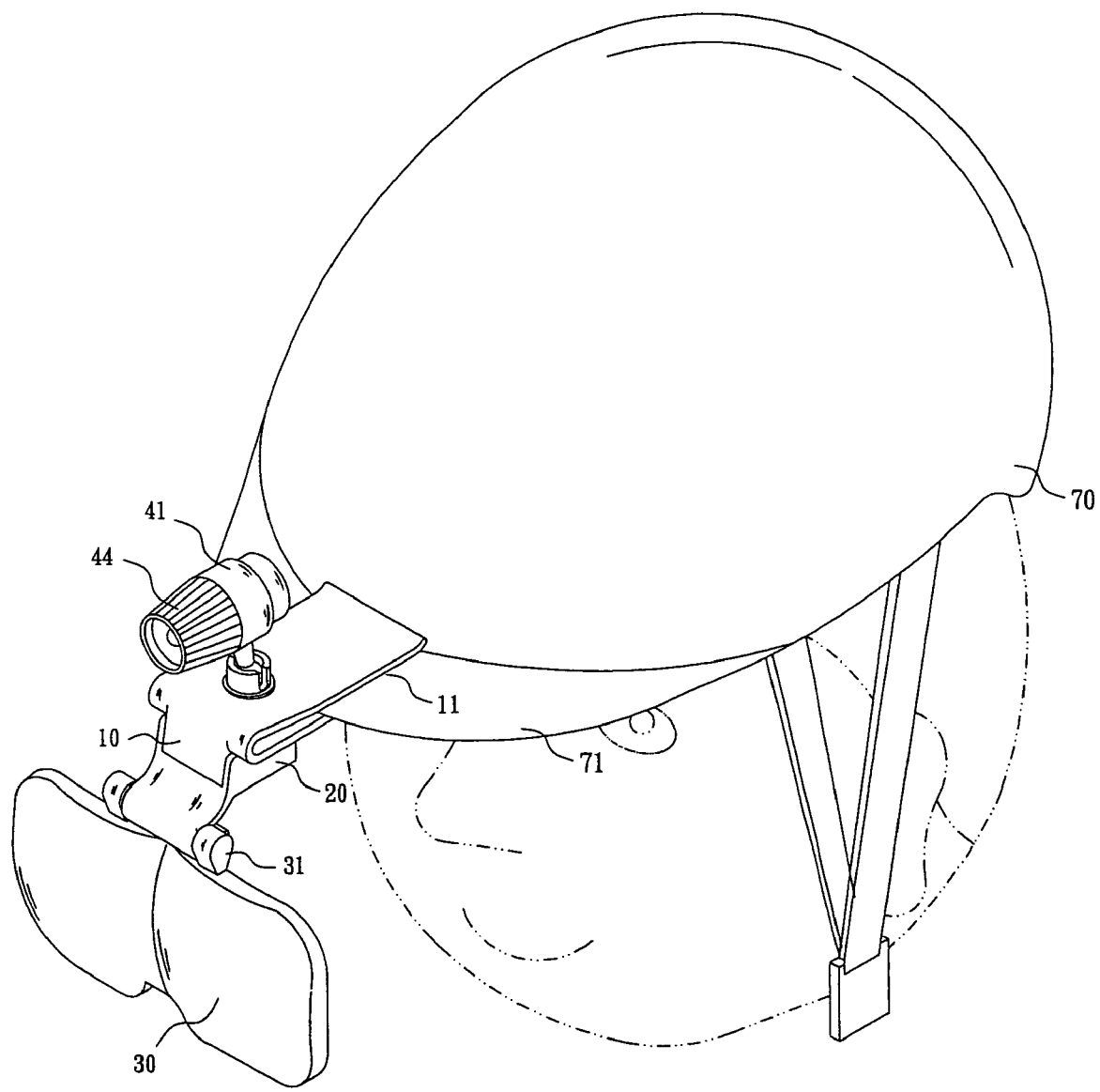
FIG. 9 is an environmental view of the lens assembly with light being mounted on the brim of a helmet covered on the head shown in phantom lines.
Figure 10:
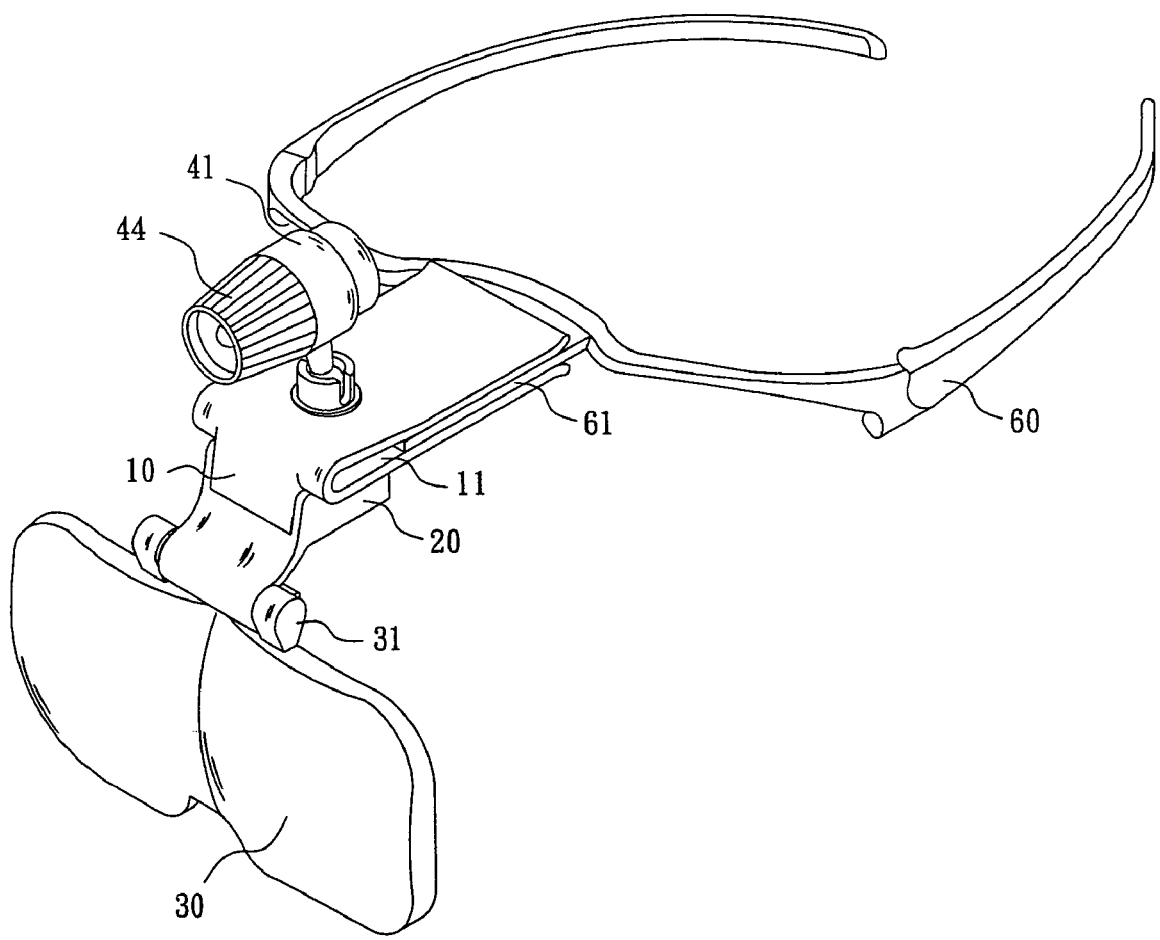
FIG. 10 is a perspective view of the lens assembly with light being coupled to a member resembled a pair of eyeglasses without lens.

Referring to FIGS. 6 to 10, a number of other arrangements, embodiments, and applications of the invention are illustrated. In FIG. 6, the mounting of the sliding seat 20 is oriented opposite the one shown above. In FIG. 8, the brim 51 of a cap 50 is inserted into the gap 11 such that the assembly is fastened at the cap 50. In FIG. 9, the brim 71 of a helmet 70 is inserted into the gap 11 such that the assembly is fastened at the helmet 70. In FIG. 10, the assembly is coupled to a member 60 via a flange 61 extending from the member 60. The member 60 resembles a pair of eyeglasses without lens. In brief, by utilizing the invention, a desired object can be seen larger and more clear through the pivotal lens (e.g., a magnifying lens) 30 and with light emitted from the universal joint type light 40. Alternatively, as shown in FIG. 7, the light 40 is removed if illumination is not required.

While the invention herein disclosed has been described by means of specific embodiments, numerous modifications and variations could be made thereto by those skilled in the art without departing from the scope and spirit of the invention set forth in the claims.

What is claimed is:

1. A device mountable on a head covering or a member held to the head, comprising:

a flexible clamp comprising an elongated gap open at a rear end of the clamp, a lower receptacle, two recessed slides formed at both outer sides of the receptacle, a toothed-section disposed on a top of the receptacle, and a flexible hollow cylinder disposed on a top of the clamp;

a sliding seat of U-section comprising two tabs at both inner sides for retaining a lower portion of the clamp in place after removably sliding the slides therethrough, a latch projecting from a bottom of the sliding seat to urge against one of a plurality of valleys of the toothed-section, and a flexible hook having a plurality of parallel teeth formed on an inner surface thereof;

a lens comprising two top risers and a ridged bar interconnected the risers, the bar being adapted to dispose in the inner surface of the hook for meshing therewith; and a light comprising a downward peg having an enlarged ball end removably inserted into the cylinder.

2. The device of claim 1, wherein the lens is a magnifying lens.

3. The device of claim 1, wherein the head covering is one of a cap and a helmet having its brim adapted to securely insert into the gap.

4. The device of claim 1, wherein the member held to the head resembles a pair of eyeglasses without lens.

5. the device of claim 1, wherein the hook is extended from a rear end of the sliding seat.

6. The device of claim 1, wherein the hook is extended from a forward end of the sliding seat.

* * * * *